(12) United States Patent
Pahnke et al.

(10) Patent No.: US 11,497,348 B2
(45) Date of Patent: Nov. 15, 2022

(54) LATCH FOR MOVABLE GRILL

(71) Applicant: TAYLOR COMMERCIAL FOODSERVICE, LLC, Rockton, IL (US)

(72) Inventors: Carl A. Pahnke, Freeport, IL (US); Dennis J. Nelson, Rockford, IL (US); Christopher P. Norris, Rockton, IL (US); Jeffrey L. Sands, Freeport, IL (US); Nathan A. Matz, Beloit, WI (US); Otley Dwight Freymiller, Deerfield, WI (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 1077 days.

(21) Appl. No.: 16/151,537

(22) Filed: Oct. 4, 2018

(65) Prior Publication Data

US 2019/0104885 A1    Apr. 11, 2019

Related U.S. Application Data

(60) Provisional application No. 62/569,906, filed on Oct. 9, 2017.

(51) Int. Cl.
*A47J 37/06* (2006.01)
*E05B 63/12* (2006.01)

(52) U.S. Cl.
CPC .......... *A47J 37/0611* (2013.01); *A47J 37/06* (2013.01); *E05B 63/121* (2013.01)

(58) Field of Classification Search
CPC ...... A47J 37/0611; A47J 37/06; E05B 63/121

USPC ......... 99/330, 340, 342, 352–355, 400, 422, 99/425; 126/30, 40, 55, 219, 277, 279;
(Continued)

(56) References Cited

U.S. PATENT DOCUMENTS

| 4,763,571 A | 8/1988 | Bergling et al. |
| 5,308,131 A | 5/1994 | Galindo et al. |
| 5,791,234 A | 8/1998 | Newton |

(Continued)

FOREIGN PATENT DOCUMENTS

| CN | 1119883 | 4/1996 |
| CN | 1989883 | 7/2007 |
| WO | WO 2009/001112 A1 | 12/2008 |

OTHER PUBLICATIONS

International Preliminary Report on Patentability for International Application No. PCT/2018/054346, dated Apr. 23, 2020.
(Continued)

*Primary Examiner* — Phuong T Nguyen
(74) *Attorney, Agent, or Firm* — Barnes & Thornburg LLP

(57) ABSTRACT

A grill includes a base structure, a first platen assembly connected to the base structure, and a second platen assembly connected to the base structure. At least the second platen assembly is movable between a first position and a second position. A latch mechanism is operable to selectively retain the upper platen assembly in the second position. The latch mechanism includes a first portion and a second portion. The second portion further comprises a retaining ring movable to receive and cooperate with the first portion when the first portion and the second portion of the latch mechanism are misaligned.

17 Claims, 4 Drawing Sheets

(58) Field of Classification Search
USPC .............. 210/184, 185, 261, 262, 451, 453; 426/417, 438
See application file for complete search history.

(56) References Cited

U.S. PATENT DOCUMENTS

| | | | |
|---|---|---|---|
| 5,910,207 | A | 6/1999 | Newton |
| 6,016,743 | A | 1/2000 | Glavan |
| 6,739,242 | B2 | 5/2004 | Patenotre et al. |
| 7,448,373 | B2 | 11/2008 | Hill |
| 7,472,645 | B2 | 1/2009 | Hill |
| 9,314,133 | B2 | 4/2016 | Fung et al. |
| 9,861,230 | B2 | 1/2018 | Sands |
| 9,927,382 | B2 | 7/2018 | Sands |
| 10,010,218 | B2 | 7/2018 | Sands et al. |
| 10,098,499 | B2 | 10/2018 | Nelson |
| 10,117,545 | B2 | 11/2018 | Nelson |
| 10,159,379 | B2 | 12/2018 | Nelson |
| 10,213,050 | B2 | 2/2019 | Freymiller |
| 2005/0120890 | A1 | 6/2005 | Hill et al. |
| 2007/0074629 | A1 | 4/2007 | Lubowicki et al. |
| 2007/0101538 | A1 | 5/2007 | Gruaz |
| 2008/0229937 | A1 | 9/2008 | Stephen et al. |
| 2013/0071534 | A1 | 3/2013 | Newton |
| 2015/0230659 | A1 | 8/2015 | Hoare et al. |
| 2015/0108110 | A1 | 10/2015 | Nelson |
| 2015/0305554 | A1 | 10/2015 | Dorsten et al. |
| 2015/0305555 | A1* | 10/2015 | Nelson ................ A47J 37/0611 99/372 |
| 2015/0305557 | A1 | 10/2015 | Nelson |
| 2016/0037967 | A1 | 2/2016 | Glavan |
| 2016/0045066 | A1 | 2/2016 | Sands et al. |
| 2016/0309941 | A1 | 10/2016 | Minard |
| 2017/0181573 | A1 | 6/2017 | Altenritter et al. |
| 2017/0181574 | A1 | 6/2017 | Altenritter et al. |
| 2018/0360269 | A1 | 12/2018 | Sands |
| 2019/0038073 | A1 | 2/2019 | Nelson |
| 2019/0045972 | A1 | 2/2019 | Freymiller |
| 2019/0059643 | A1 | 2/2019 | Minard |
| 2019/0075966 | A1 | 3/2019 | Kelly |
| 2019/0104885 | A1 | 4/2019 | Pahnke |
| 2019/0117019 | A1 | 5/2019 | Minard |

OTHER PUBLICATIONS

International Search Report and Written Opinion for PCT/US2018/054346, dated Dec. 21, 2018, 14 pp.
English translation of Office Action issued in Appl. No. CN201880065560 (dated Jul. 27, 2022).

* cited by examiner

LATCH FOR MOVABLE GRILL

RELATED APPLICATION

The present patent document claims the benefit of the filing date under 35 U.S.C. § 119(e) of Provisional U.S. Patent Application Ser. No. 62/569,906, filed Oct. 9, 2017, which is hereby incorporated by reference.

BACKGROUND

The present disclosure relates generally to a grill, and more particularly to a grill having a movable lower grill plate having a latch to secure and upper plate and movable grease receptacles.

Grills or griddles are used to cook various foods, such as hamburgers for example. In some conventional grills, the sides of the food are grilled sequentially. The food is placed on a grilling surface, thus grilling the side of the food that contacts the grilling surface. After that side of the food is cooked, the food is manually flipped to cook the opposite side. After both sides of the food are cooked, the food is manually removed from the grill for serving.

Other conventional grills, such as clamshell grills for example, are capable of simultaneously cooking two sides of various food items, such as hamburger patties, sausage patties, chicken, or other foods. In particular, clamshell grills are often used in commercial establishments, such as fast-food restaurants for example, because they reduce overall cooking time and the amount of operator attention required for cooking.

A conventional clamshell grill generally includes an upper platen assembly movably connected to a lower platen assembly. For example, the upper platen assembly may be pivotally coupled to the lower platen assembly for movement between a lower cooking position overlying the lower platen assembly and a raised position inclined upwardly from the lower platen assembly. When the upper platen assembly is in the lowered cooking position, a gap is created between the upper and lower platen assemblies. This gap is generally adjustable according to the thickness of the food being cooked. For example, hamburger patties are pre-formed in several different sizes (i.e. a quarter pound patty has a greater thickness than a regular patty). To cook the food, an operator selects the gap size and a cooking time via an operator interface for the food item being cooked.

Conventional clamshell grills typically include a latch mechanism for retaining the upper platen assembly in a lowered position to maintain a compressive force applied to food being cooked. Existing latch mechanisms require the movable and fixed portions of the latch mechanism to be aligned within a tight tolerance. However, frequent calibration of the platen assemblies, and in some instances movement of the lower platen assembly during operation of the grill, result in misalignment of the corresponding portions of the latch mechanism.

BRIEF DESCRIPTION

According to an embodiment, a grill includes a base structure, a first platen assembly connected to the base structure, and a second platen assembly connected to the base structure. At least the second platen assembly is movable between a first position and a second position. A latch mechanism is operable to selectively retain the upper platen assembly in the second position. The latch mechanism includes a first portion and a second portion. The second portion further comprises a retaining ring movable to receive and cooperate with the first portion when the first portion and the second portion of the latch mechanism are misaligned.

In addition to one or more of the features described above, or as an alternative, in further embodiments when the first portion and the second portion are misaligned, contact between the first portion and the retaining ring causes the retaining ring to move into alignment with the first portion.

In addition to one or more of the features described above, or as an alternative, in further embodiments when the first portion and the second portion are aligned, the retaining ring does not move within the second portion.

In addition to one or more of the features described above, or as an alternative, in further embodiments the second platen assembly further comprises an arm, and the second portion of the latch mechanism is coupled to the arm.

In addition to one or more of the features described above, or as an alternative, in further embodiments the second portion further comprises a cap coupled to a free end of the arm, where the retaining ring is in direct contact with the free end of the arm and a surface of the cap.

In addition to one or more of the features described above, or as an alternative, in further embodiments each of the retaining ring and the cap has an opening formed therein for receiving the first portion of the latch mechanism.

In addition to one or more of the features described above, or as an alternative, in further embodiments the retaining ring is movable within a plane relative to the cap and the free end of the arm.

In addition to one or more of the features described above, or as an alternative, in further embodiments the plane has a substantially horizontal orientation.

In addition to one or more of the features described above, or as an alternative, in further embodiments an inner diameter of the cap is greater than an outer diameter of the retaining ring such that a clearance is defined there between.

In addition to one or more of the features described above, or as an alternative, in further embodiments the retaining ring is formed from stainless steel.

In addition to one or more of the features described above, or as an alternative, in further embodiments a material of the retaining ring has been hardened via a material treatment process.

In addition to one or more of the features described above, or as an alternative, in further embodiments the first portion of the latch mechanism further comprises a base having a resilient detent, and an inner surface of the retaining ring is configured to cooperate with the detent to restrict movement of the second portion relative to the first portion.

In addition to one or more of the features described above, or as an alternative, in further embodiments the retaining ring is symmetrical about a central plane extending through the retaining ring.

In addition to one or more of the features described above, or as an alternative, in further embodiments the first portion of the latch mechanism is integrally formed with the base structure.

In addition to one or more of the features described above, or as an alternative, in further embodiments the latch mechanism is configured to selectively couple the second platen assembly to the base structure adjacent a front of the grill.

According to another embodiment, a grill includes a base structure, a lower platen assembly connected to the base structure and including a lower grilling plate, and an upper platen assembly movably connected to the base structure such that the upper platen assembly is movable between a raised position and a lowered position. The upper platen assembly includes an upper grilling plate. A latch mechanism includes a lower portion and an upper portion configured to cooperate with the lower portion to selectively retain the upper platen assembly in the lowered position. The upper portion further comprises a retaining ring movable to receive and cooperate with the lower portion when the upper portion and the lower portion are misaligned.

In addition to one or more of the features described above, or as an alternative, in further embodiments when the lower portion and the upper portion are misaligned, contact between the lower portion and the retaining ring causes the retaining ring to move into alignment with the lower portion.

In addition to one or more of the features described above, or as an alternative, in further embodiments the upper platen assembly further comprises an arm, and the upper portion of the latch mechanism is coupled to the arm.

In addition to one or more of the features described above, or as an alternative, in further embodiments the retaining ring is movable within a horizontal plane relative to a free end of the arm.

In addition to one or more of the features described above, or as an alternative, in further embodiments the lower portion of the latch mechanism further comprises a base having a resilient detent, and an inner surface of the retaining ring is configured to cooperate with the detent to restrict movement of the upper portion relative to the lower portion.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
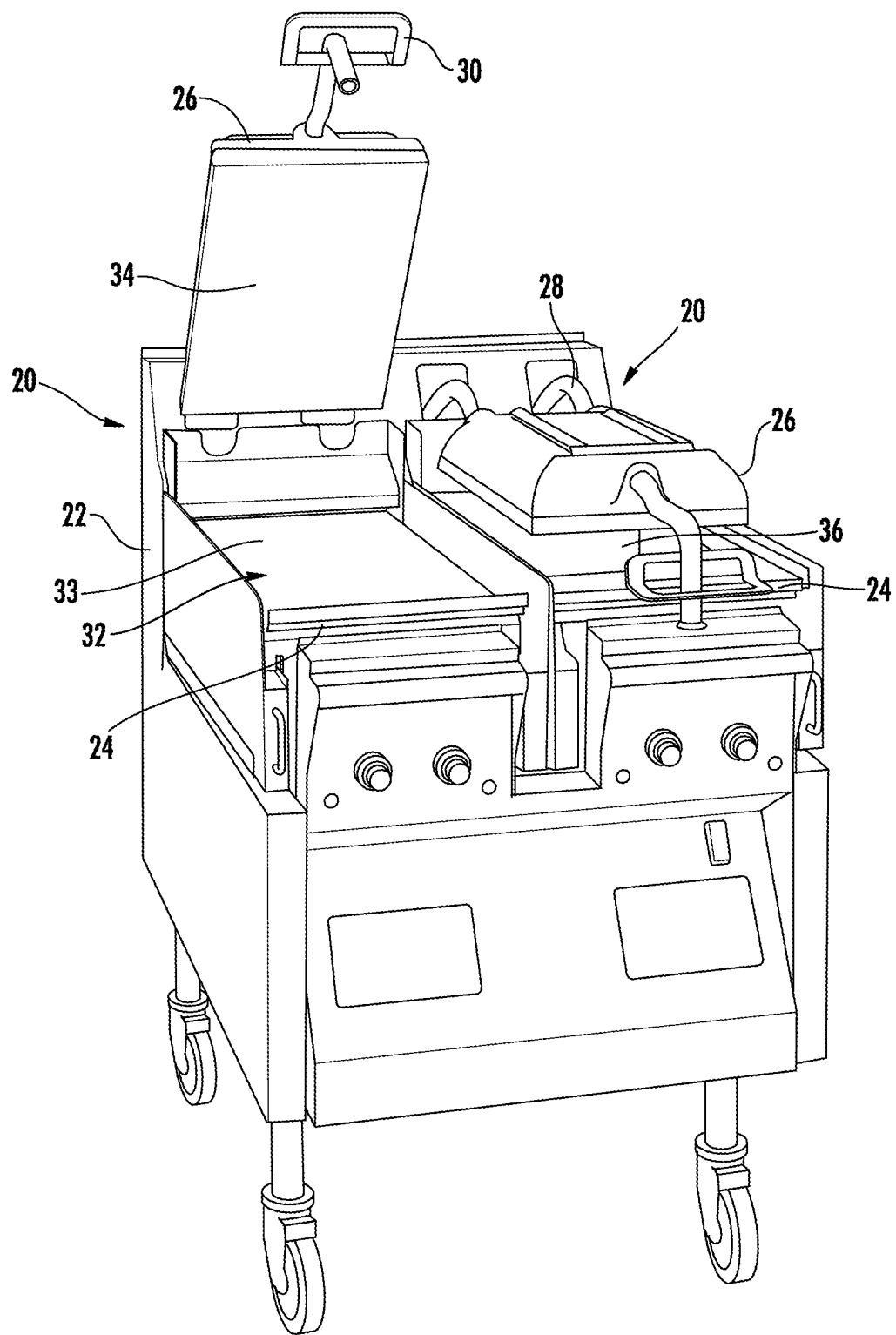
FIG. 1 is a perspective view of a grill in a lowered position according to an embodiment.

Referring now to the FIGS., a grill 20 is illustrated having a rigid base structure 22 supporting a lower platen assembly 24 and an upper platen assembly 26. The upper platen assembly 26 may be fixed relative to the base structure 22 or alternatively, may be movably attached to the base structure 22 with a mounting structure 28 such that the upper platen assembly 26 is configured to move between a lowered, cooking position and an upper raised position relative to the lower platen assembly 24. In one embodiment, the mounting structure 28 is a hinge such that the upper platen assembly 26 is configured to pivot relative to the lower platen assembly 24; however, in other embodiments, the upper platen assembly 26 may be vertically lowered and raised in a generally linear motion. The upper platen assembly 26 may be moved between the raised and lowered positions either automatically or manually. In embodiments where the upper platen assembly 26 is moved manually, the upper platen assembly 26 may include a handle 30 that can be grabbed by an operator to move the upper platen assembly 26 between the raised and lowered positions. When the upper platen assembly 26 is lifted by an operator to the raised position, the grilling surface of the lower platen assembly 24 is exposed.

The lower platen assembly 24 includes a lower grilling plate 32 and the upper platen assembly 26 includes an upper grilling plate 34. Food items are placed on an exposed grilling surface 33 of the lower grilling plate 32 by the operator for cooking. The operator moves the upper platen assembly 26, such as via handle 30 for example, to the lowered position such that the one or more food items to be cooked are positioned within a gap 36 formed between the upper and lower grilling plates 32, 34.

The lower grilling plate 32 is configured to provide heat to the lower side of one or more food items placed thereon and the upper grilling plate 34 is configured to provide heat to an upper side of the food items located on the lower grilling plate 32. The upper and lower grilling plates 32, 34 are heated by a heater (not shown) to cook the food items. In order to transmit heat to the food items cooked by the grill, the lower and upper grilling plates 32, 34, respectively, may be formed of a heat-conducting material, such as cast aluminum, abrasion-resistant steel, cast iron, stainless steel, mild steel, a ceramic material, or other suitable heat conducting materials used in grills. Although the lower and upper grilling plates 32, 34 are shown as having a rectangular shape, one or both of the grilling plates 32, 34 may also be formed into other shapes, such as circular or oval shapes for example. As illustrated in FIG. 1, a plurality of individual grills 20 may be arranged adjacent one another to form a grill assembly. In one embodiment, a portion of each grill 20, such as the base structure 22 for example, is integrally formed.

Figure 2:
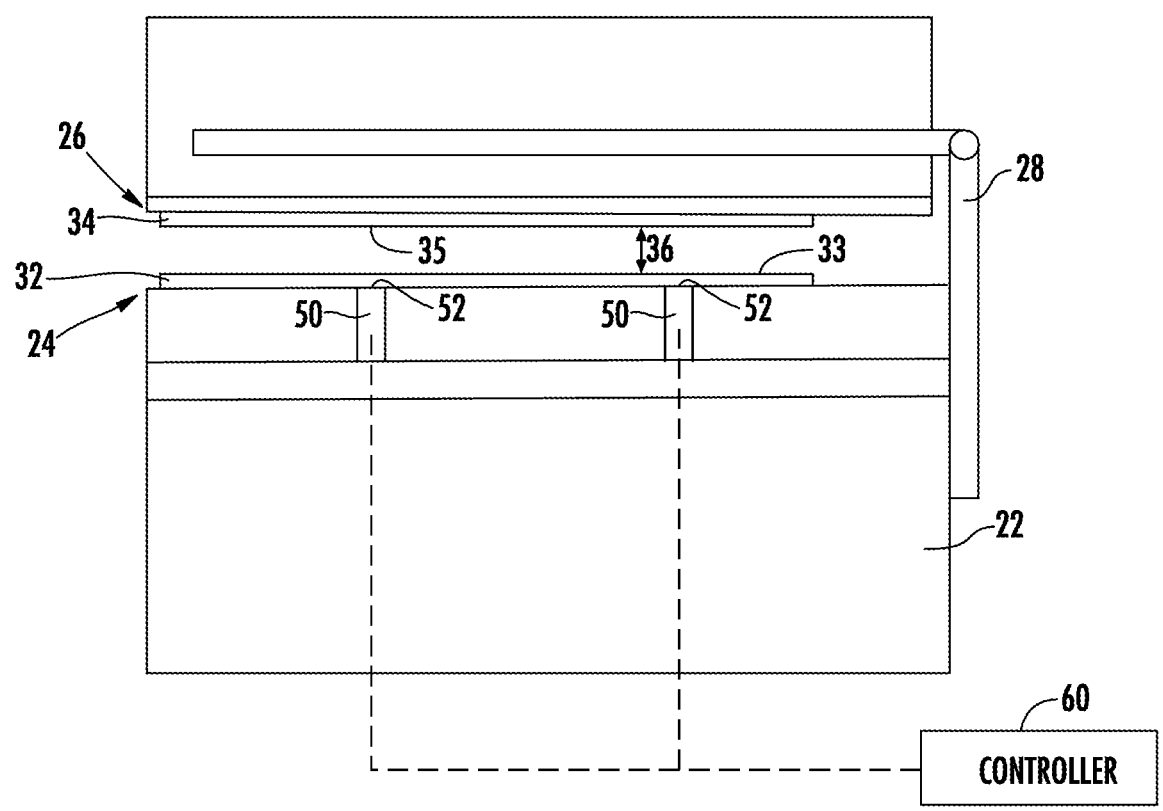
FIG. 2 is a schematic cross-sectional view of a grill according to an embodiment.

As shown in FIG. 2, the lower platen assembly 24 includes a plurality of leveling mechanisms 50 for controlling the tilt, angle, and/or attitude of the lower grilling plate 32. Although two leveling mechanisms 50 are illustrated in the FIGS., embodiments having three, or alternatively, any number of leveling mechanisms 50 are within the scope of the disclosure. A portion of each leveling mechanism 50 is connected to the base structure 22, such as with a mounting bracket (not shown) for example, and a first end 52 of each leveling mechanism 50 is connected to the lower grilling plate 32. The first ends 52 may be positioned about a peripheral region of the lower grilling plate 32. It is to be understood that the first end 52 of the leveling mechanisms 50 do not need to be positioned at an edge of the lower grilling plate 32. Rather, a person having ordinary skill in the art would understand that the peripheral region encompasses the portion of the lower grilling plate 32 that allows suitable control of the position of the lower grilling plate 32 by the extension or retraction of the leveling mechanisms 50.

A control 60 is configured to independently operate each of the plurality of leveling mechanisms 50. As a result, the lower grilling plate 32 may be arranged in a non-horizontal configuration. In one embodiment, the leveling mechanisms 50 are linear actuators, such as hydraulic, pneumatic, or mechanical actuators for example. One or more sensors (not shown) are configured to monitor each of the plurality of leveling mechanisms 50 and detect when the lower grilling plate 32 contacts the upper grilling plate 34. In one embodiment, the sensors are Hall Effect sensors or encoders configured to monitor the position of a movable portion 54 of the leveling mechanisms 50 and determine when each leveling mechanism 50 reaches a stall position. Alternatively, other types of sensors, such as sensors configured to monitor current, load, or another characteristic of the plurality of leveling mechanisms 50 for example, is also within the scope of the disclosure. Through the leveling mechanisms 50, the position of the lower grilling plate 32 and/or the initial gap between the lower and upper grilling plates 32, 34, respectively, may be adjusted to accommodate the variation of thickness of the food items to be cooked on the grill 20. Moreover, the plurality of leveling mechanisms 50 may apply a positive pressure on the lower grilling plate 32 and consequently on the food items as they are being cooked on the grill 20.

The grill 20 may be automatically calibrated to ensure that the gap 36 between the lower grilling plate 32 and the upper grilling plate 34 is maintained at a desired size. By calibrated, it is meant that the upper grilling plate 34 and the lower grilling plate 32 are level to one another to ensure proper cooking of food items. In one example, the grill 20 is calibrated daily to correct any unleveling of the lower grilling plate 32 that may have occurred during the previous day.

Figure 3:
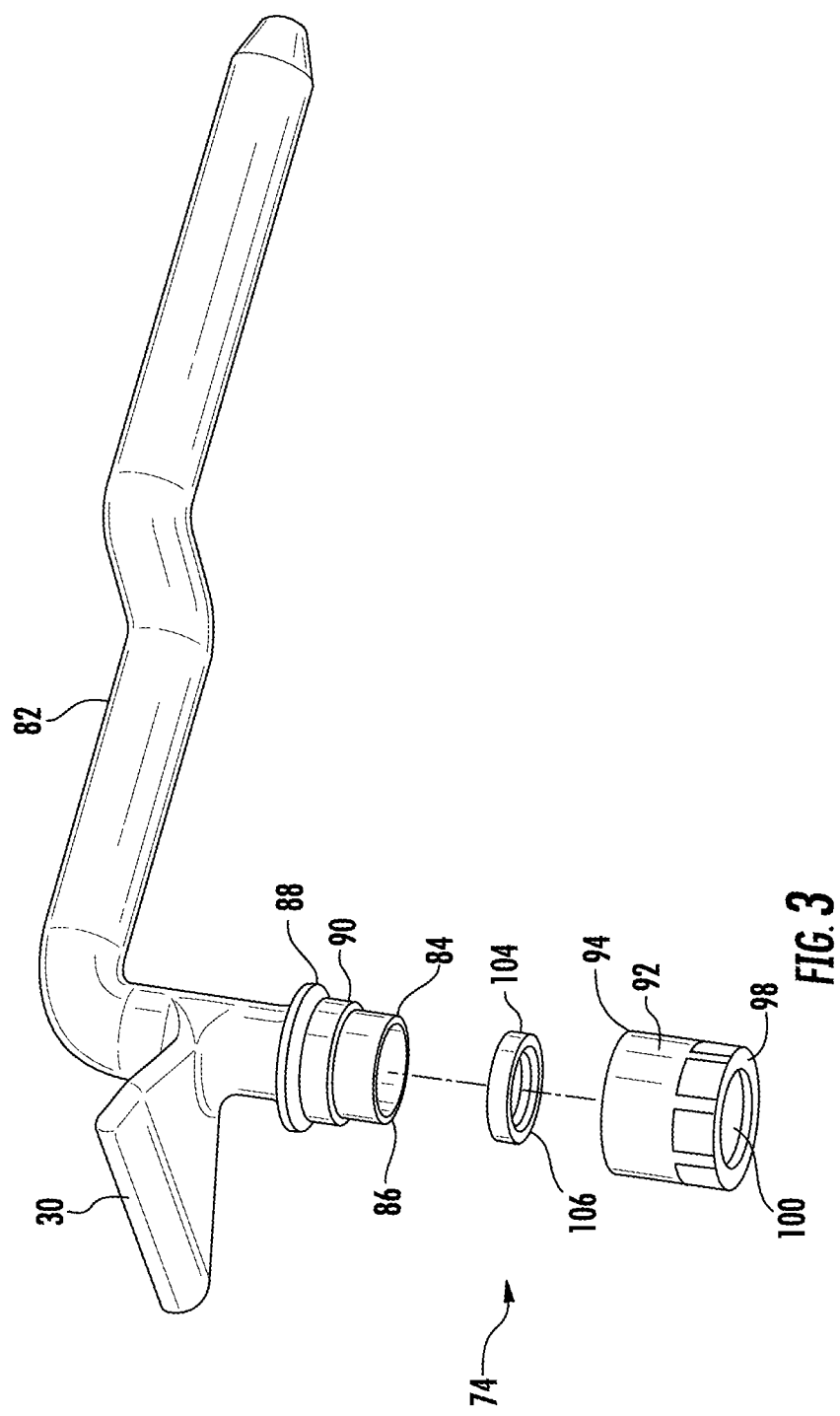
FIG. 3 is an exploded view of a portion of a latch assembly according to an embodiment.
Figure 4:
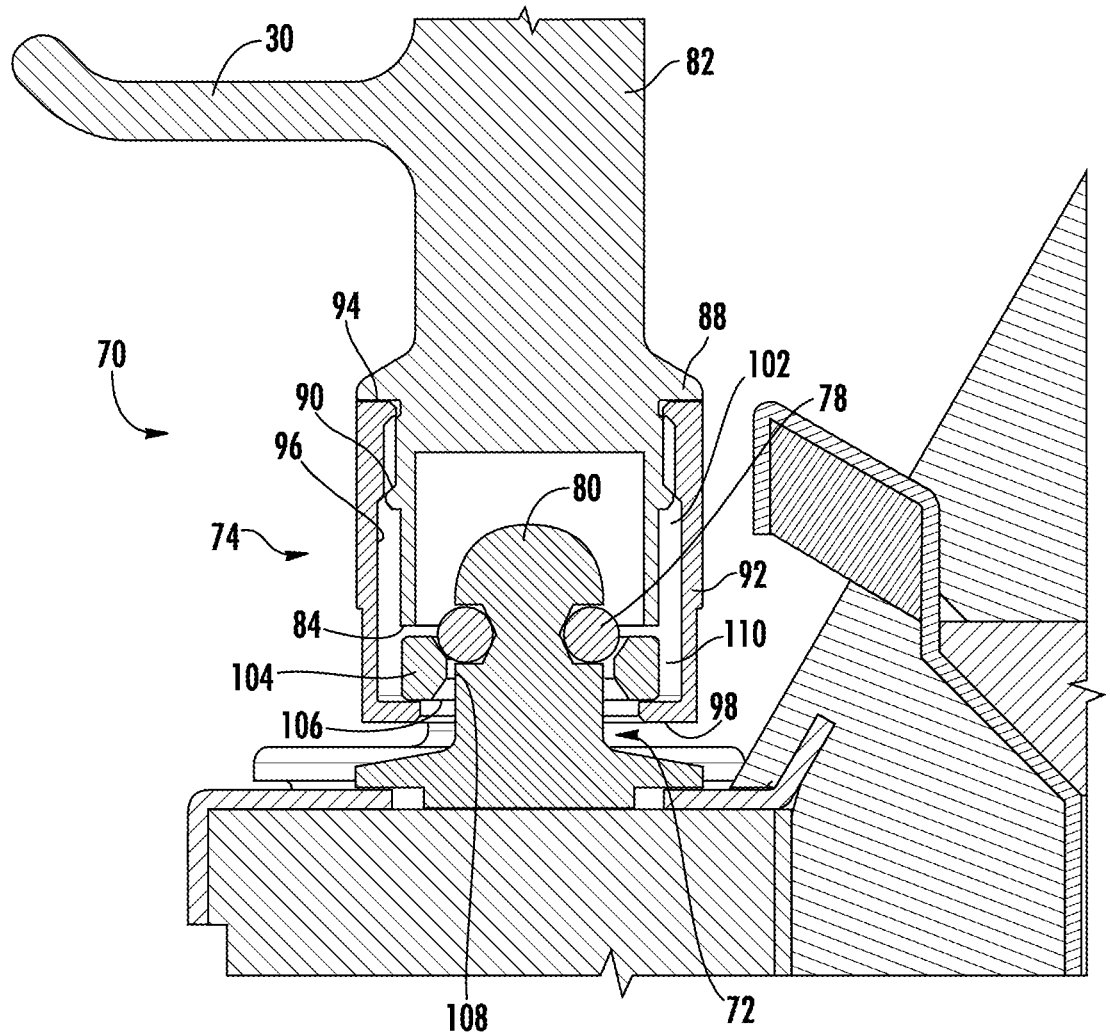
FIG. 4 is a cross-sectional view of a latch assembly according to an embodiment.

Referring now to FIGS. 3 and 4, the grill 20 further includes a latch assembly 70 for selectively retaining the upper platen assembly 26 in the lowered positioned. The latch assembly 70 includes a lower portion 72 and an upper portion 74 that cooperate with one another. The lower portion 72 includes a first component 76, such as a base for example, attached to a portion of the grill 20 generally adjacent the lower platen assembly 24. In the illustrated, non-limiting embodiment, the base 76 of the latch assembly 70 is coupled to the base 22 of the grill 20, between the lower platen assembly 24 and a front of the grill 20. The base 76 protrudes upwardly from a surface of the grill 20 and includes a detent 78 positioned adjacent a distal end 80 of the base 76. The detent 78 is a resilient member movable relative to the base 76, such as within a plane arranged generally perpendicular to the longitudinal axis of the base 76 for example. As shown, the detent 78 may be a spring loaded ball that is biased outwardly. However any suitable detent is within the scope of the disclosure.

The upper portion 74 of the latch assembly 70 further includes an arm 82 extending from the upper platen assembly 26. The handle 30 for assisting an operator of the grill 20 with moving the upper platen assembly 26 between a raised position and a lowered position may be coupled to or integrally formed with a portion of the arm 82. In the illustrated, non-limiting embodiment, the handle 30 is has a generally triangular shape. However, a handle 30 having any shape is within the scope of the disclosure.

A free end 84 of the arm 82 includes a hollow cavity 86 within which the distal end 80 of the base 76 is receivable. In an embodiment, a flange 88 extends outwardly from the exterior of the arm 82 at a position offset from the free end 84 of the arm 82. Alternatively, or in addition, one or more teeth or protrusions 90 may extend outwardly from the surface of arm 82 at a position between the flange 88 and the free end 84.

A cap 92 is receivable over the free end 84 of the arm 82. When coupled to the arm 82, a first end 94 of the cap 92 directly abuts the flange 88 and the one or more teeth 90 engage an inner surface 96 of the cap 90 to restrict movement of the cap 92 relative to the arm 82. In other embodiments, the cap 90 is configured to threadably connect to the arm 82. However, any suitable means for connecting the cap 92 to the free end 84 of the arm 82 is contemplated herein. A second end 98 of the cap 92 is configured to align with the free end 84 of the arm 82 and includes an opening 100 arranged in communication with the interior of the cavity 86. The opening 100 formed in the second end 98 of the cap 92 is also sized to receive the distal end 80 of the base 76.

Positioned within a hollow interior 102 of the cap 92, directly between the second end 98 of the cap 92 and the free end 84 of the arm 82 is a retaining ring 104. The retaining ring 104, cap 92, and arm 82 may all be formed from any suitable material, including, but not limited to a metal, such as stainless steel for example. In an embodiment, one or more material treatment processes may be applied to the retaining ring 104. For example, the material of the ring 104 may be a material that was hardened through a heat treatment process.

The retaining ring 104 includes an opening 106 for receiving the distal end 80 of the base 76 and has a contoured inner surface or lip 108 that cooperates with the detent 78 of the base 76. The retaining ring 104 is arranged in contact with both the free end 84 of the arm 82 and the second end 98 of the cap 92. As a result of this engagement, the ring 104 is restricted from moving vertically toward the free end 84 of the arm 82 and/or the second end 98 of the cap 92. However, an outer diameter of the ring 104 is smaller than an inner diameter of the cap 92. Because of this clearance between the retaining ring 104 and the cap 92, the ring 104 is free to translate within a substantially horizontal plane arranged generally parallel to the free end 84 of the arm 82 and the second end 98 of the cap 92. This translation between the retaining ring 104 and the cap 92 allows the base 76 and the detent 78 to be received within the opening 106 of the retaining ring 104 when the upper portion 74 and the lower portion 72 of the latch are not perfectly aligned.

To operate the latch mechanism 70, the upper platen assembly 26 is pivoted towards a lowered position causing the free end 84 of the arm 82 to engage and couple to the base 76 of the latch mechanism 70. In an embodiment, the contoured inner surface 108 includes a ramped surface configured to apply a force to the detent 78 that opposes a biasing force of the detent 78 as the upper platen assembly 26 is lowered and raised relative to the lower platen assembly 24. In an embodiment, the detent 78 may include an internal mechanism M, such as a spring for example, configured to bias the detent 78 outwardly. In another embodiment, the internal mechanism M may be a contoured plunger that is movable to adjust the magnitude of the biasing force acting on the detent 78.

Once the upper platen assembly 26 is in the lowered position, the compressive force applied to the detent 78 by surface 108 of the retaining ring 104 is removed, thereby allowing the detent 78 to be biased outwardly. In this configuration, engagement between the detent 78 and the inner surface 108 of the ring 104 restricts movement of the arm 84 out of engagement with the base 76. Further, the contoured surface 108 may be symmetrical about a central plane extending through the ring, parallel to the free end of the arm and the second end of the cap. In such embodiments, the latch mechanism will function properly regardless of the orientation of the ring when positioned within the cap. To decouple the portions 72, 74 of the latch mechanism 70, a sufficient force is applied to the upper platen assembly 26. The contoured surface 108 of the retaining ring 104 opposes the biasing force of the detent 78, thereby allowing the upper portion 74 of the latch 70 to move relative to the lower portion 72 of the latch. Once the retaining ring 104 has moved beyond the detent 78, the biasing force of the detent 78 will bias the detent 78 outwardly to the neutral position.

Because the retaining ring 104 is movable within a plane relative to the cap 98, the retaining ring 104 is configured to engage the base 76 even when the retaining ring 104 and the base 76 are not properly aligned. Accordingly, inclusion of a latch assembly 70 as described herein allows the upper platen assembly to be coupled to the base 22 with a greater degree of misalignment between the upper and lower portions 72, 74. Further, the latch assembly 70 may be retrofit into existing grills 20 to improve the operational efficiency of such grills.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A grill comprising:
    a base structure;
    a lower platen assembly connected to the base structure and including a lower grilling plate;
    an upper platen assembly movably connected to the base structure such that the upper platen assembly is movable between a raised position and a lowered position, the upper platen assembly including an upper grilling plate; and
    a latch mechanism including a lower portion and an upper portion configured to cooperate with the lower portion to selectively retain the upper platen assembly in the lowered position, wherein the upper portion further comprises a retaining ring movable to receive and cooperate with the lower portion when the upper portion and the lower portion are misaligned.

2. The grill according to claim 1, wherein when the lower portion and the upper portion are misaligned, contact between the lower portion and the retaining ring causes the retaining ring to move into alignment with the lower portion.

3. The grill according to claim 2, wherein when the lower portion and the upper portion are aligned, the retaining ring does not move within the upper portion.

4. The grill according to claim 1, wherein the upper platen assembly further comprises an arm, and the upper portion of the latch mechanism is coupled to the arm.

5. The grill according to claim 4, wherein the retaining ring is movable within a horizontal plane relative to a free end of the arm.

6. The grill of claim 4, wherein the upper portion further comprises a cap coupled to a free end of the arm, where the retaining ring is in direct contact with the free end of the arm and a surface of the cap.

7. The grill according to claim 6, wherein each of the retaining ring and the cap has an opening formed therein for receiving the first portion of the latch mechanism.

8. The grill according to claim 6, wherein the retaining ring is movable within a plane relative to the cap and the free end of the arm.

9. The grill according to claim 6, wherein an inner diameter of the cap is greater than an outer diameter of the retaining ring such that a clearance is defined there between.

10. The grill according to claim 1, wherein the lower portion of the latch mechanism further comprises a base having a resilient detent, and an inner surface of the retaining ring is configured to cooperate with the detent to restrict movement of the upper portion relative to the lower portion.

11. The grill according to claim 1, wherein a material of the retaining ring has been hardened via a material treatment process.

12. The grill of claim 1, wherein the upper portion further comprises a cap that coupled to a free end of the arm, wherein the arm has a flange and an end of the cap abuts the flange.

13. The grill of claim 12, wherein one or more teeth extend outwardly from a surface of the arm, and wherein an inner surface of the cap engage the one or more teeth.

14. The grill of claim 12, wherein the cap threadably connects to the arm.

15. The grill of claim 12, wherein an end of the cap aligns with a free end of the arm.

16. The grill of claim 12, wherein the retaining ring is supported by the cap.

17. The grill of claim 16, wherein the retaining ring is constrained by the cap and the arm such that the retaining ring is restricted from moving vertically within the cap, but is free to translate within a substantially horizontal plane generally parallel to the free end of the arm.

* * * * *